(12) United States Patent
Arnold et al.

(10) Patent No.: US 7,517,396 B2
(45) Date of Patent: Apr. 14, 2009

(54) APPARATUS FOR OPTIMAL ADSORPTION AND DESORPTION OF GASES UTILIZING HIGHLY POROUS GAS STORAGE MATERIALS

(75) Inventors: Gerd Arnold, Nauheim (DE); Ulrich Eberle, Mainz (DE); Dieter Hasenauer, Weinheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 443 days.

(21) Appl. No.: 11/348,107

(22) Filed: Feb. 6, 2006

(65) Prior Publication Data

US 2007/0180998 A1    Aug. 9, 2007

(51) Int. Cl.
*F17C 11/00* (2006.01)
*B01J 8/02* (2006.01)

(52) U.S. Cl. .................. 96/126; 96/134; 96/146; 206/0.7

(58) Field of Classification Search .......... 96/108, 96/121, 126–128, 133–135, 143, 144, 146; 502/526; 423/248, 648.1; 206/0.7
See application file for complete search history.

(56) References Cited

U.S. PATENT DOCUMENTS

| | | | | |
|---|---|---|---|---|
| 2,548,335 A | * | 4/1951 | Balogh | 96/147 |
| 3,739,558 A | * | 6/1973 | Hurson | 96/151 |
| 3,803,043 A | * | 4/1974 | Magladry et al. | 252/625 |
| 4,135,621 A | * | 1/1979 | Turillon et al. | 206/0.7 |
| 4,165,569 A | * | 8/1979 | Mackay | 34/416 |
| 4,187,092 A | * | 2/1980 | Woolley | 62/46.2 |
| 4,318,720 A | * | 3/1982 | Hoggatt | 96/135 |
| 4,859,427 A | * | 8/1989 | Konishi et al. | 422/159 |
| 6,432,379 B1 | * | 8/2002 | Heung | 423/648.1 |
| 7,112,239 B2 | * | 9/2006 | Kimbara et al. | 96/108 |
| 2002/0134247 A1 | * | 9/2002 | Spiegelman et al. | 96/135 |
| 2003/0170165 A1 | * | 9/2003 | Kojima et al. | 423/445 R |
| 2005/0188847 A1 | * | 9/2005 | Fujita et al. | 96/126 |

FOREIGN PATENT DOCUMENTS

| | | | | |
|---|---|---|---|---|
| JP | 559-008601 A | * | 1/1984 |
| JP | 62-119393 A | * | 5/1987 |
| JP | 63-225799 A | * | 9/1988 |

OTHER PUBLICATIONS

"Systematic design of Pore Size and Functionality in Isoreticular MOFs and Their Application in Methane Storage", M. Eddaoudi, J. Kim, N. Rosi, D. Vodak, J. Wachter, M. O'Keeffe, O. Yaghi, Science, V. 295, 469-472, Jan. 18, 2002.

(Continued)

*Primary Examiner*—Frank M Lawrence

(57) ABSTRACT

An apparatus for selectively adsorbing gas during adsorption processes and desorbing gas during desorption processes. A tube has a porous sidewall, and at each end is an end-fitting sealingly connected thereto. A particulate porous gas storage material is located within the tube, wherein the porosity prevents the material, but allows gases, to pass therethrough. A selected gas from a porous inner tube, a heating coil, or a heat exchanger located within the tube may provide heat for the desorption processes, and the selected gas or heat exchanger may provide cooling during the adsorption processes.

13 Claims, 5 Drawing Sheets

OTHER PUBLICATIONS

"Hydrogen Storage in Microporous Metal-Organic Frameworks", N. Rosi, J. Eckert, M. Eddaoudi, D. Vodak, J. Kim, M. O'Keeffe, O. Yaghi, Science, V. 300, 1127-1129, May 16, 2003.

"A Route to High Surface Area, Porosity and Inclusion of Large Molecules in Crystals", H. Chae, D. Siberio-Perez, J. Kim, Y.B. Go, M. Eddaouddi, A. Matzger, M. O'Keeffe, O. Yaghi, Nature, V. 427, 523-527, Feb. 5, 2004.

"Microporous Polymeric Materials", P. Budd, S. Makhseed, B. Ghanem, K. Msayib, C. Tattershall, N. McKweon, Materials Today, 40-46, Apr. 2004.

"New Materials for the Separation and Storage of Hydrogen", B. Bockrath, C. Matranga, J. Culp, E. Bittner, M. Smith, B. Meyers, National Energy Technology Laboratory, U.S. Dept. of Energy, 39 pages, Aug. 1, 2005.

"News Release: Nanocubes as Hydrogen Storage Units: The "Battery of Tomorrow" for Laptops and Cell Phones" 10 pages (with additional 10 page Powerpoint) P348e, BASF Aktiengesellschaft, Ludwigshafen, Germany, Oct. 28-29, 2002.

* cited by examiner

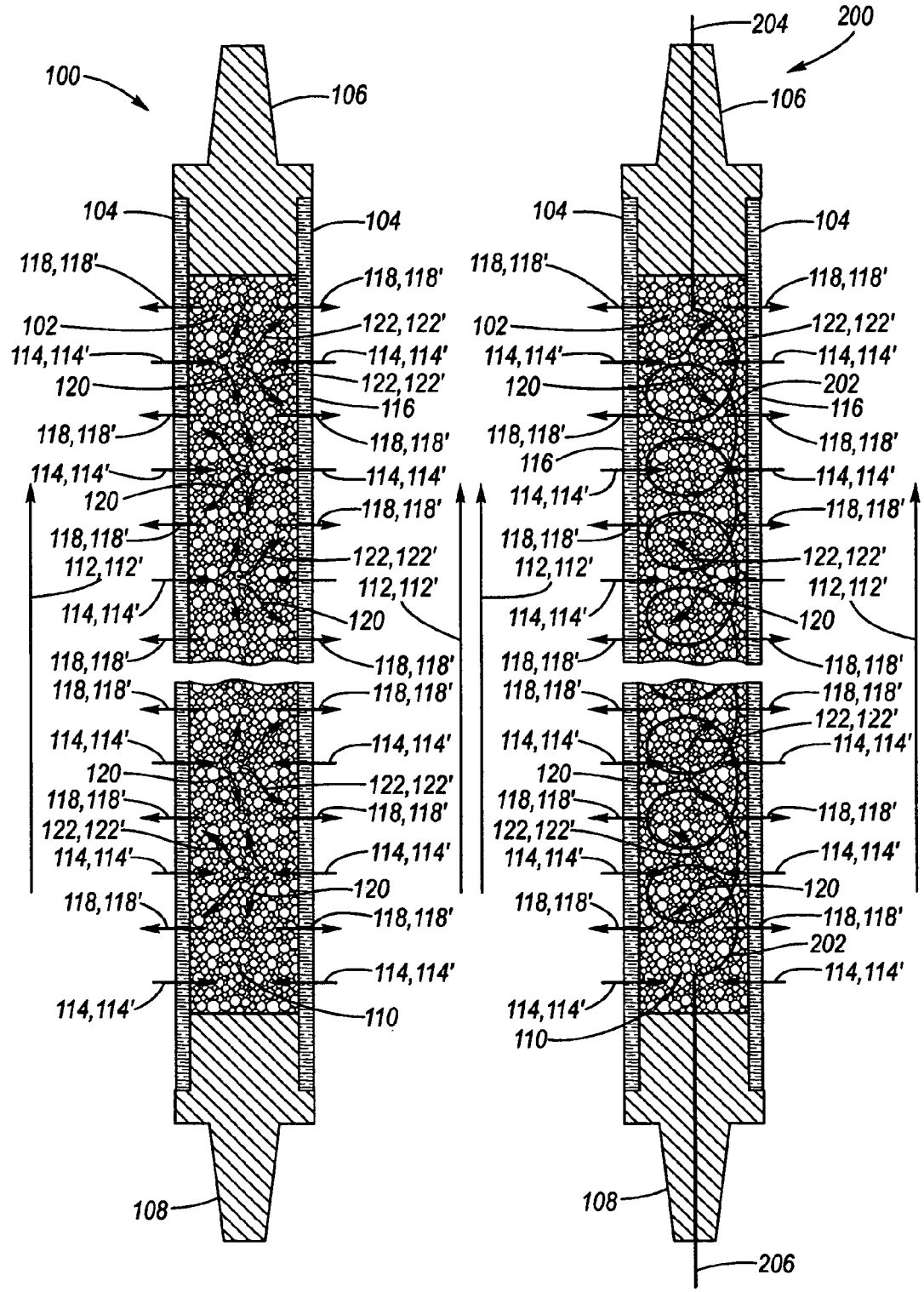

APPARATUS FOR OPTIMAL ADSORPTION AND DESORPTION OF GASES UTILIZING HIGHLY POROUS GAS STORAGE MATERIALS

TECHNICAL FIELD

The present invention relates to adsorption and desorption of gases and, more particularly, to an apparatus for optimal adsorption and desorption of gases utilizing highly porous gas storage materials.

BACKGROUND OF THE INVENTION

With respect to processes for the storage of gases, the development of highly porous materials, for example hydrogen, natural gas, etc., by means of adsorption, are the object of recent research. To date, gas absorption storage systems exist only for applications utilizing metal hydride powders wherein, for example, hydrogen molecules are split and the protons are bound chemically to the host material or stored in intersticial sites of the metal lattice, also called hydrogen ($H_2$) absorption or hydriding. Applications (e.g. for vehicles and submarines) involve large pressure vessels with chambers containing the metal hydride powders. Heat exchangers are located inside the storage vessel, since during the absorption process heat energies of typically 30 kJ/mol $H_2$ are produced. A hydrided material normally expands by 20% to 30% in volume compared to its initial state. Thus, the problem of expansion/shrinking of the host material during operation also has to be resolved (e.g. by using compartments connected to springs).

With respect to adsorption processes for the storage of gases, highly porous gas storage materials suitable for adsorption and desorption of gases are known in the prior art. Such materials are, for example, activated charcoal, metal organic frameworks (MOFs and MILs), nano-cubes, coordination polymers (CPs), prussian blue analogues, or polymers of intrinsic microporosity. A description of highly porous gas storage materials can be found in the articles written by Professor Yaghi of the University of Michigan, published in Science magazine. (Systematic Design of Pore Size and Functionality of Isoreticular MOFs and Their Application in Methane Storage, Science Vol. 295, 18 Jan. 2002; Hydrogen Storage in Microporous Metal-Organic Frameworks, Science Vol. 300, 16 May 2003). Also, in a press release by Dr. Ulrich Muller, of BASF, 28/29 10, 2002, "Nano-cubes for Hydrogen Storage" MOFs are described here as "Nano-cubes". Highly porous polymers suitable as gas storage materials are also described in an article in Materials Today, April 2004, "Microporous Polymeric Materials". All these highly porous gas storage materials have surface area densities from 3,000 $m^2/g$ (activated charcoal, MOF5) to more than 4,500 $m^2/g$ (MOF177, NATURE, Vol. 427, 5 Feb. 2004, "A Route to High Surface Area Porosity and Inclusion of Large Molecules in Crystals"). Recently developed MOFs (MILs), such as nano-cubes, have shown surface area densities greater than 5,000 $m^2/g$, ie., MIL 101 with 5,600 $m^2/g$ (MIL-101 is a new, unusually porous material whose unit cell has an unprecedented volume of about 702,000 cubic Angstroms, meaning that the solid is about 90% empty space once the solvent molecules normally filling its pores are removed. It also boasts pores that are 29 or 34 Angstroms across and an internal surface area of 5,900 $m^2/g$ (Science 2005, 309, 2040).

Due to their high porosity (typical mass densities ranging from 0.3 to 0.6 $g/cm^3$) and high surface area, highly porous gas storage materials could be used for the storage of gases, such as methane and hydrogen. The gas is adsorbed (using very weak van der Waals forces) on the large surface areas as a monolayer (for moist cases). These highly porous gas storage materials are usually fine powders. To increase the volumetric density, they could be compressed to be formed into fine or course granulated material (pellets). This granulated material has a higher mass density, eg., about 0.7$g/cm^3$, but also an up to 30% reduction in the surface area. These highly porous gas storage materials may be filled into a pressure vessel. The heat generated during the adsorption process (adsorption energy between about 3 and 6 kJ/mol $H_2$ with MOFs and about 6 kJ/mol $H_2$ with activated charcoal) should be compensated by a heat exchanger. There may be ambient temperature and cryogenic operation modes depending on the gas, for example $H_2$ or natural gas.

The stored gas is removed from the vessel by desorption. Desorption occurs by a reduction of the gas pressure and by a suitable supply of heat energy. The supplied and exhausted heat energy is greater than the adsorption/desorption energies.

Gas adsorption technologies are currently used mainly for gas purification purposes (e.g. Pressure Swing Adsorption) rather than for storage and retrieval of gases by adsorption and desorption, respectively. A typical purification application in the automotive industry is a purge container connected to gasoline or diesel fuel tanks. These containers intermediately capture and store evaporated hydrocarbons from automobiles for the control of diurnal and hot soak conditions as well as in the more demanding fuel filling cycle.

Also, simply filling a pressurized vessel with a highly porous gas storage material does not meet optimal gas flow and heat removal requirements. A structured arrangement of the highly porous gas storage material is necessary for optimized adsorption and desorption of the stored gas.

Furthermore, although storage systems utilizing metal hydride powders for gas absorption are known, there are currently no storage systems or apparatus available for optimal adsorption and desorption of gases utilizing highly porous gas storage materials.

Accordingly, what is needed in the art is a storage system or apparatus for optimal adsorption and desorption of gases utilizing highly porous gas storage materials.

SUMMARY OF THE INVENTION

The present invention is a gas storage system or apparatus for optimal adsorption and desorption of gases, preferably hydrogen or natural gas, utilizing highly porous gas storage materials, for example, activated charcoal, metal organic frameworks (MOFs and MELs), nano-cubes, coordination polymers (CPs) or polymers of intrinsic microporosity, in particulate form as either a powder or a granular form (pellets), wherein the highly porous gas storage material is arranged in such a manner as to allow generally free flow of gases therethrough, at suitable temperatures and pressures, during adsorption and desorption processes and also allows for ample removal and supply of heat energy during adsorption and desorption processes, respectively, thereby providing optimal adsorption and desorption of the gases.

The present invention employs hollow tubes, each tube having a sidewall of a very fine perforated, woven or fleece structure. The sidewall is, preferably, cylindrical but may be otherwise shaped, as for example polygonal, and is porous, being made of, for example, woven (weaved) fiber material, synthetic materials, glass or metallic fibers, or synthetic fleece materials, into which is placed the above described highly porous gas storage material, wherein the size of the pores or perforations of the fleece or woven (weaved) fiber material of the porosity of the sidewall is smaller than the size of the powder particles or pellets of the highly porous gas storage material so as to contain the highly porous gas storage material within the tubes. The ends of the tubes are sealingly closed to contain the highly porous gas storage material within the tubes by end-fittings, which, for example, may have conical shaped portions to improve their sealing capability, and can be secured to the tubes with a suitable adhesive, if necessary. The sidewall porosity is such that size of the pores or perforations of the very fine perforated, woven or fleece sidewall allows generally free gas flow through the sidewall during desorption and adsorption processes, as well as for ample removal and supply of heat energy during the adsorption and desorption processes, respectively, as well as preventing the loss or discharge of the highly porous gas storage material from the tubes.

A first preferred embodiment of the present invention is a gas storage system or apparatus consisting of hollow tubes, each tube having a sidewall of a very fine perforated, woven or fleece structure as above described, in which is placed the above described highly porous gas storage material, wherein each tube end is closed to contain the highly porous gas storage material within the tubes with end-fittings, as described above. As mentioned, the size of the pores or perforations of the very fine perforated, woven or fleece tube material allow generally free gas flow through the sidewall of the tubes during desorption and adsorption, for ample removal and supply of heat energy during adsorption and desorption processes, respectively, as well as preventing the loss or discharge of the highly porous gas storage material from the tubes. The highly porous gas storage material placed within the tubes may be compacted, if necessary, if the tubes are subject to vibration or elevated pressures.

A gas to be adsorbed, for example hydrogen, under suitable temperature and pressure, enters the tubes by penetrating into the very fine perforated, woven or fleeced sidewall through the pores or perforations thereof, wherein a portion of the gas is adsorbed by the highly porous gas storage material. The non-adsorbed portion of the gas is heated by heat generated by the adsorption process and leaves the tubes by penetrating out of the very fine perforated, woven or fleeced sidewall through the pores or perforations thereof and thereby acts as a convective cooling media.

To desorb the gas adsorbed by the highly porous gas storage material within the tubes, a second gas, suitably heated, under suitable pressure, and, preferably, the same gas as the adsorbed gas, enters the tubes by penetrating into the very fine perforated, woven or fleeced sidewall through the pores or perforations thereof, wherein the second gas provides the required desorption energy to the highly porous gas storage material, and thereby acts as a convective heating media to cause the adsorbed gas to become desorbed. The desorbed gas and the second gas leave the tubes by penetrating out of the very fine perforated, woven or fleeced sidewall through the pores or perforations thereof.

A second preferred embodiment of the present invention is a storage system or apparatus, suitable for ambient and cryogenic applications, consisting of a heating coil placed within each of the tubes of the first preferred embodiment of the present invention. The aforementioned highly porous gas storage material is pressed against the heating coil to achieve optimal thermal contact between the heating coil and the highly porous gas storage material resulting in improved thermal conductivity during the desorption process. Adsorption of gas utilizing the second preferred embodiment of the present invention proceeds generally as described for the first preferred embodiment of the present invention.

According to the second preferred embodiment of the present invention, to desorb the gas adsorbed by the highly porous gas storage material within the tubes, a second gas, under suitable pressure, and, preferably, the same gas as the adsorbed gas, enters the tubes by penetrating into the very fine perforated, woven or fleeced sidewall through the pores or perforations thereof, wherein the heat produced by the heating coil provides, preferably, the required desorption energy to the highly porous gas storage material.

Alternately, the second gas is suitably heated so as to thereby act as a convective heating media such that the second gas, in conjunction with the heat produced by the heating coil, collectively provide the required desorption energy to the highly porous gas storage material. The desorbed gas and the second gas leave the tubes by penetrating out of the very fine perforated, woven or fleeced sidewall through the pores or perforations thereof.

A third preferred embodiment of the present invention is a storage system or apparatus consisting of a hollow inner gas distribution tube having a porous or perforated inner tube sidewall placed in the center of the tube of the first preferred embodiment of the present invention producing a "tube-in-tube" configuration, wherein the tube of the first preferred embodiment is, de facto, an "outer tube". Alternately, a very fine perforated, woven or fleece material, for example, felt, may be wrapped around the inner tube sidewall facing the highly porous gas storage material (i.e., at the outside surface of the inner gas distribution tube). In either case, the inner sidewall has a porosity whereby the size of the pores or perforations there are sized to prevent the highly porous gas storage material from entering into the inner gas distribution tube.

In accordance with the third preferred embodiment of the present invention, the inner gas distribution tube is constructed of a material, for example a low thermal conductivity material, whereby a temperature gradient alongside the inner gas distribution tube is provided such that a steady temperature distribution alongside the inner gas distribution tube exists, thereby resulting in steady gas adsorption and desorption alongside the inner gas distribution tube. The inner sidewall passes sealingly through one of the end-fittings and is sealingly closed at the other of the end fittings.

A gas to be adsorbed, for example hydrogen, under suitable temperature and pressure, is introduced into the inner gas distribution tube, thereby entering the region containing the highly porous gas storage material through the pores or perforations of the inner tube sidewall of the inner gas distribution tube and, if the outside surface of the inner gas distribution tube sidewall is wrapped with a very fine perforated, woven or fleece material, then also through the pores or perforations thereof, whereby a portion of the gas is adsorbed by the highly porous gas storage material. The non-adsorbed portion of the gas is heated by heat generated by the adsorption process and leaves the (outer) tube by penetrating out of its very fine perforated, woven or fleeced sidewall through the pores or perforations thereof so as to thereby act as a convective cooling media.

To desorb the gas adsorbed by the highly porous gas storage material, a second gas, suitably heated, under suitable pressure, and, preferably, the same gas as the adsorbed gas, is introduced into the inner gas distribution tube, thereby entering the region containing the highly porous gas storage material through the pores or perforations of the inner sidewall and, if the outside surface of the inner gas distribution tube is wrapped with a very fine perforated, woven or fleece material, also through the pores or perforations of the weave or fleece thereof, wherein the second gas provides the required desorption energy to the highly porous gas storage material, and thereby acts as a convective heating media to cause the adsorbed gas to desorb. The desorbed gas and the second gas leave the (outer) tube by penetrating out of its very fine perforated, woven or fleeced sidewall through the pores or perforations thereof.

A fourth preferred embodiment of the present invention is a storage system or apparatus consisting of a hollow, continuous sidewall (ie., non-porous or non-perforated) inner heat exchanger tube or pipe, preferably a conductor, herein referred to as a heat exchanger, placed in the axial center of the tube of the first preferred embodiment described hereinabove and passing through the end fittings thereof, wherein the tube described in the first preferred embodiment of the present invention is now, once again, a de facto "outer tube".

The highly porous gas storage material is pressed against the heat exchanger to achieve optimal thermal contact between the heat exchanger and the highly porous gas storage material resulting in improved thermal conductivity during the adsorption and desorption processes, wherein a cooling media of suitable temperature and pressure flows through the heat exchanger during the adsorption process to remove the heat generated by the adsorption process and a heating media of suitable temperature and pressure flows through the heat exchanger during the desorption process to supply the required desorption energy.

A gas to be adsorbed, for example hydrogen, under suitable temperature and pressure, enters the (outer) tube by penetrating into its very fine perforated, woven or fleeced sidewall through the pores or perforations thereof, wherein a portion of the gas is adsorbed by the highly porous gas storage material. A cooling media of suitable temperature and pressure flows through the heat exchanger during the adsorption process to remove the heat generated by the adsorption process. The non-adsorbed portion of the gas leaves the (outer) tube by penetrating out of its very fine perforated, woven or fleeced sidewall through the pores or perforations thereof. Alternately, the non-adsorbed portion of the gas is heated by heat generated by the adsorption process and leaves the (outer) tube by penetrating out of its very fine perforated, woven or fleeced sidewall through the pores or perforations thereof, and thereby acts as a convective cooling media in conjunction with the cooling media flowing through the heat exchanger.

To desorb the adsorbed gas adsorbed by the highly porous gas storage material within the (outer) tube, a heating media of suitable temperature and pressure flows through the heat exchanger during the desorption process to supply the required desorption energy to the highly porous gas storage material. The desorbed gas leaves the (outer) tube by penetrating out of its very fine perforated, woven or fleeced sidewall through the pores or perforations thereof.

Alternatively, a second gas, suitably heated, under suitable pressure, and, preferably, the same gas as the adsorbed gas, enters the (outer) tube by penetrating into its very fine perforated, woven or fleeced sidewall through the pores or perforations thereof, wherein the second gas, acting as a convective heating media, in conjunction with a heating media of suitable temperature and pressure flowing through the heat exchanger, collectively provide the required desorption energy to the highly porous gas storage material to thereby desorb the adsorbed gas. The desorbed gas and the second gas leave the (outer) tube by penetrating out of its very fine perforated, woven or fleeced outermost sidewall through the pores or perforations thereof.

BRIEF DESCRIPTION OF THE DRAWING

The description herein makes reference to the accompanying drawings wherein like reference numerals refer to like parts throughout the several views.

FIG. 1 is a cross-sectional view of a first apparatus according to a first preferred embodiment of the present invention.

FIG. 2 is a cross-sectional view of a second apparatus according to a second preferred embodiment of the present invention.

DESCRIPTION OF THE PREFERRED EMBODIMENT

Figure 3:
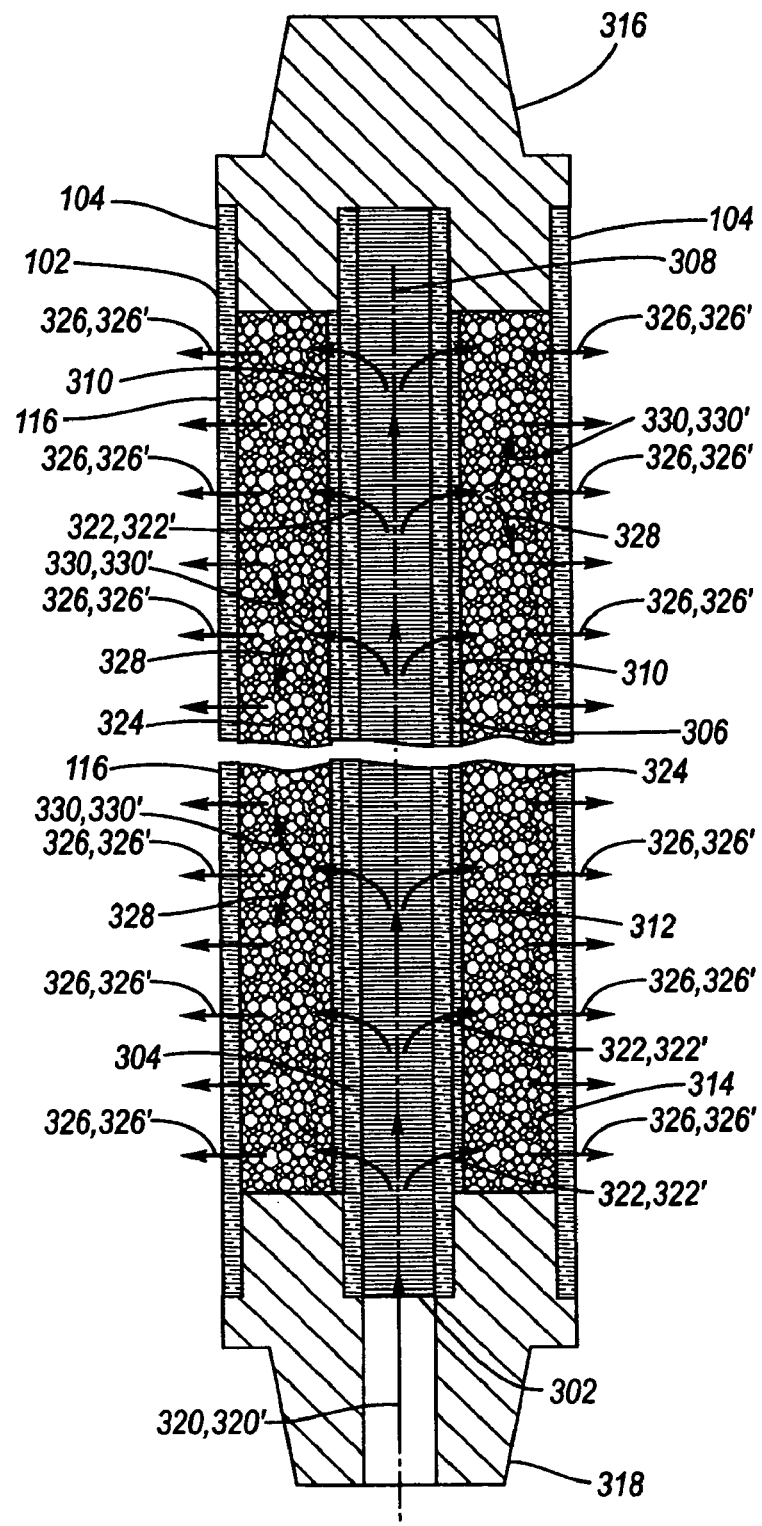
FIG. 3 is a cross-sectional view of an example of a third apparatus according to a third preferred embodiment of the present invention.

Referring now to the Drawings, FIG. 1 is a cross-sectional view of a first apparatus 100 according to a first preferred embodiment of the present invention. The first apparatus 100 consists of hollow tube 102 having a sidewall 104 and end fittings 106, 108. The sidewall 104 is porous, being constructed of very fine perforated, woven or fleece materials made of, for example, woven (weaved) fiber material, synthetic materials, glass or metallic fibers, or synthetic fleece materials as previously described hereinabove. The tube 102 is filled with a highly porous gas storage material 110 in particulate form as either a powder or a granular (pellet) form. Highly porous gas storage materials suitable for adsorption and desorption of gases are known in the prior art. Such materials are, for example, activated charcoal, metal organic frameworks (MOFs and MILs), nano-cubes, coordination polymers (CPs) or polymers of intrinsic microporosity, as mentioned hereinabove.

A gas 112 surrounds the sidewall 104 of the tube 102, under suitable temperature and pressure, and a penetration portion 114 of the gas enters the tube by penetrating into the very fine perforated, woven or fleeced sidewall through the pores or perforations 116 thereof, wherein an adsorbed portion 120 of the penetration portion of the gas is adsorbed by the highly porous gas storage material 110. A non-adsorbed portion 122 of the penetration portion 114 of the gas 112 becomes heated by heat generated by the adsorption process. This now heated, non-adsorbed portion 118 of the gas 112 leaves the tube 102 by penetrating out of the very fine perforated, woven or fleeced sidewall 104 through the pores or perforations 116 thereof, and thereby acts as a convective cooling media. The highly porous gas storage material 110 placed within the tube 102 may be compacted, if necessary, if the tube is subject to vibration or elevated pressures.

The sidewall porosity is such that size of the pores or perforations of the very fine perforated, woven or fleece sidewall allows generally free gas flow through the sidewall during desorption and adsorption processes, as well as for ample removal and supply of heat energy during the adsorption and desorption processes, respectively, as well as preventing the loss or discharge of the highly porous gas storage material from the tubes.

To desorb the adsorbed portion 120 of the gas 112 which had been adsorbed by the highly porous gas storage material 110 within the tube 102, a second gas 112' surrounding the sidewall 104 of the tube, suitably heated and under suitable pressure, and, preferably, is the same gas as the adsorbed gas, has a penetration portion 114' which enters the tube by penetrating into the very fine perforated, woven or fleeced sidewall through the pores or perforations 116 thereof, wherein the second gas provides the required desorption energy to the highly porous gas storage material, and thereby acts as a convective heating media to cause the adsorbed portion of the gas to desorb. The desorbed gas 122' and the penetration portion 114' of the second gas 112' collectively form a gas 118' which leaves the tube 102 by penetrating out of the very fine perforated, woven or fleeced sidewall 104 through the pores or perforations 116 thereof.

FIG. 2 is a cross-sectional view of a second apparatus 200 according to a second preferred embodiment of the present invention. The second apparatus 200 is comprised of the apparatus 100 of FIG. 1 and a heating coil 202 placed within tube 102 with electrical leads 204, 206 thereof passing through end-fittings 106, 108, respectively. The highly porous gas storage material 110 in powder or granular (pellet) form is pressed against the heating coil 202 to achieve optimal thermal contact between the heating coil and the highly porous gas storage material. Adsorption of the penetration portion 114 of the gas 112 utilizing the second apparatus 200 proceeds as described for the first apparatus 100 of FIG. 1. Highly porous gas storage materials suitable for adsorption and desorption of gases are known in the prior art. Such materials are, for example, activated charcoal, metal organic frameworks (MOFs and MILs), nano-cubes, coordination polymers (CPs) or polymers of intrinsic microporosity, as mentioned hereinabove.

To desorb the adsorbed portion 120 of the gas 112 which had been adsorbed by the highly porous gas storage material 110 within the tube 102, a second gas 112' surrounding the sidewall 104 of the tube, under suitable pressure, and, preferably, is the same gas as the adsorbed gas, has a penetration portion 114' which enters the tube by penetrating into the very fine perforated, woven or fleeced sidewall through the pores or perforations 116 thereof, wherein the heat produced by the heating coil 202 provides the required desorption energy to the highly porous gas storage material to cause the adsorbed portion 120 of the gas 112 to desorb. The desorbed gas 122' and the penetration portion 114' of the second gas collectively form a gas 118' which leaves the tube 102 by penetrating out of the very fine perforated, woven or fleeced sidewall 104 through the pores or perforations 116 thereof.

Alternately, the second gas 112' surrounding the sidewall 104 of the tube, suitably heated and under suitable pressure, and, preferably, the same gas as the gas 112, has a penetration portion 114' which enters the tube by penetrating into the very fine perforated, woven or fleeced sidewall through the pores or perforations 116 thereof, and thereby acts as a convective heating media, wherein the penetration portion of the second gas in conjunction with the heat produced by the heating coil 202 provide the required desorption energy to the highly porous gas storage material 110 to cause the adsorbed portion 120 of the gas 112 to desorb. The desorbed gas 122' and the penetration portion 114' of the second gas 112' collectively form a gas 118' which leaves the tube 102 by penetrating out of the very fine perforated, woven or fleeced sidewall 104 through the pores or perforations 116 thereof.

FIG. 3 is a cross-sectional view of an example of a third apparatus 300 according to a third preferred embodiment of the present invention. The third apparatus 300 consists of end-fittings 316, 318 and an inner gas distribution tube 302 placed in the axial center 308 of the tube 102 of the first preferred embodiment of the present invention, where now the tube 102 is, de facto, an "outer tube" with respect to the inner gas distribution tube in a tube-in-tube configuration. The inner gas distribution tube 302 is formed of an inner sidewall 306 which passes sealingly through one of the end-fittings 318 and is sealingly closed at the other of the end fittings 316. The inner sidewall 306 has pores or perforations 304 formed therein. In this example, a very fine perforated, woven or fleece cover material 310, for example felt, wrapped around the inner sidewall 306 of the inner gas distribution tube 302, whereby the sidewall is provided with a porosity such that size of the pores or perforations 312 of the very fine perforated, woven or fleece cover material prevent the highly porous gas storage material 314 placed in region 324 within the (outer) tube 102 between its sidewall 104 and the inner sidewall 306, particles in powder or granular (pellet) form, from entering into the inner gas distribution tube. Highly porous gas storage materials suitable for adsorption and desorption of gases are known in the prior art. Such materials are, for example, activated charcoal, metal organic frameworks (MOFs and MILs), nano-cubes, coordination polymers (CPs) or polymers of intrinsic microporosity, as mentioned hereinabove.

The very fine perforated, woven or fleece cover material 310 wrapped around the inner sidewall 306 is constructed of very fine perforated, woven or fleece materials made of, for example, woven (weaved) fiber material, synthetic materials, glass or metallic fibers, or synthetic fleece materials as previously described hereinabove.

In accordance with the third preferred embodiment of the present invention, the hollow inner gas distribution tube 302 is constructed of a material, for example a low thermal conductivity material, whereby a temperature is provided alongside the hollow inner gas distribution tube such that a steady temperature distribution alongside the hollow inner gas distribution tube exists, thereby resulting in steady gas adsorption or desorption alongside the hollow inner gas distribution tube.

A gas 320, under suitable temperature and pressure, is introduced into the inner gas distribution tube 302 by which a penetration portion 322 of the gas enters the region 324 containing the highly porous gas storage material 314 through the pores or perforations 304 of the inner sidewall 306 of the inner gas distribution tube and through the pores or perforations 312 of the weave or fleece cover material 310, whereby an adsorbed portion 328 of the penetration portion of the gas is adsorbed by the highly porous gas storage material. A non-adsorbed portion 330 of the penetration portion 322 of the gas 320 is heated by heat generated by the adsorption process. The now heated, non-adsorbed portion 326 leaves the (outer) tube 102 by penetrating out of its very fine perforated, woven or fleeced sidewall 104 through the pores or perforations 116 thereof and thereby acts as a conductive cooling media.

To desorb the adsorbed portion 328 of the gas 320 which had been adsorbed by the highly porous gas storage material 314, a second gas 320', suitably heated and under suitable pressure, and, preferably, the same gas as the adsorbed gas, is introduced into the inner gas distribution tube 302 by which a penetration portion 322' of the second gas enters the region 324 containing the highly porous gas storage material through the pores or perforations 304 of the inner sidewall 306 of the inner gas distribution tube and through the pores or perforations 312, wherein the second gas provides the required desorption energy to the highly porous gas storage material for causing the adsorbed gas to desorb and further acts as a convective heating media. The desorbed gas 330' and the penetration portion 322' of the second gas 320' collectively form a gas 326' which leaves the tube 102 by penetrating out of the very fine perforated, woven or fleeced sidewall 104 through the pores or perforations 116 thereof.

Figure 4:
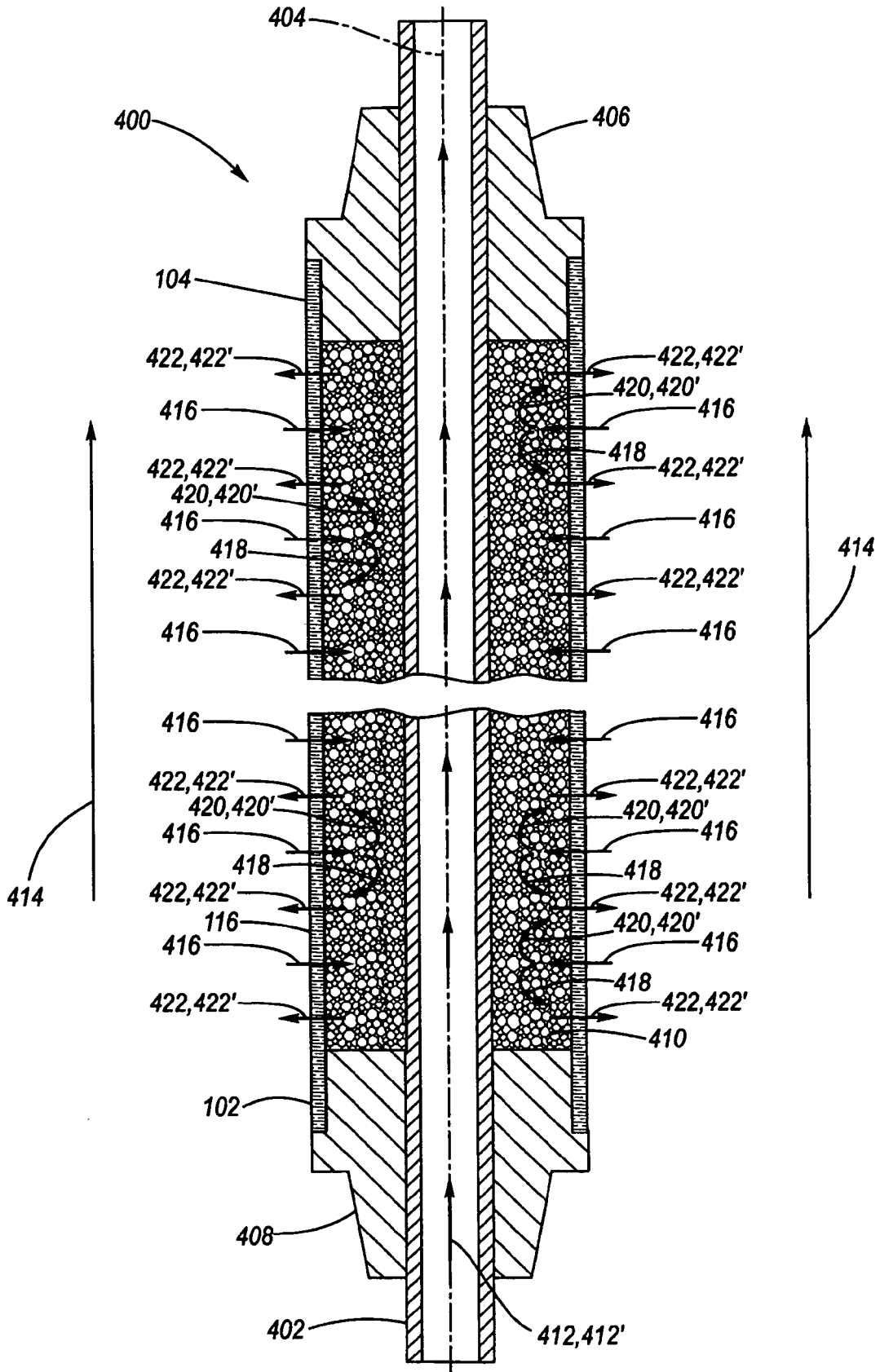
FIG. 4 is a cross-sectional view of an example of a fourth apparatus according to a fourth preferred embodiment of the present invention.
Figure 5D:
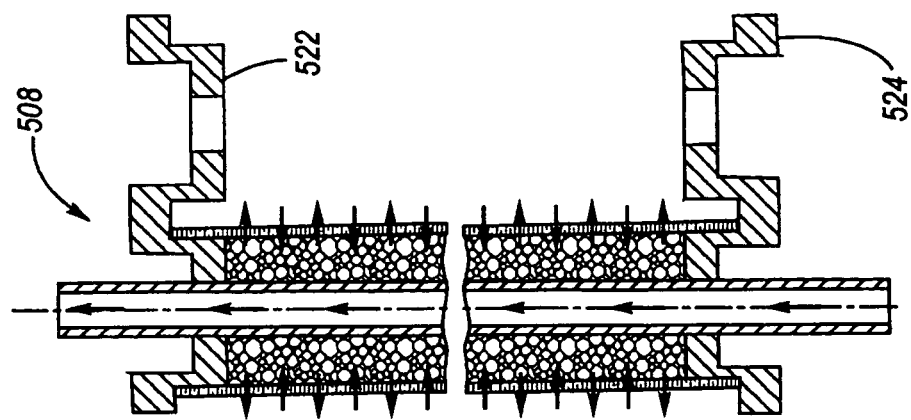
FIG. 5D is a cross-sectional view of a fourth apparatus connector according to the fourth preferred embodiment of the present invention.
Figure 5C:
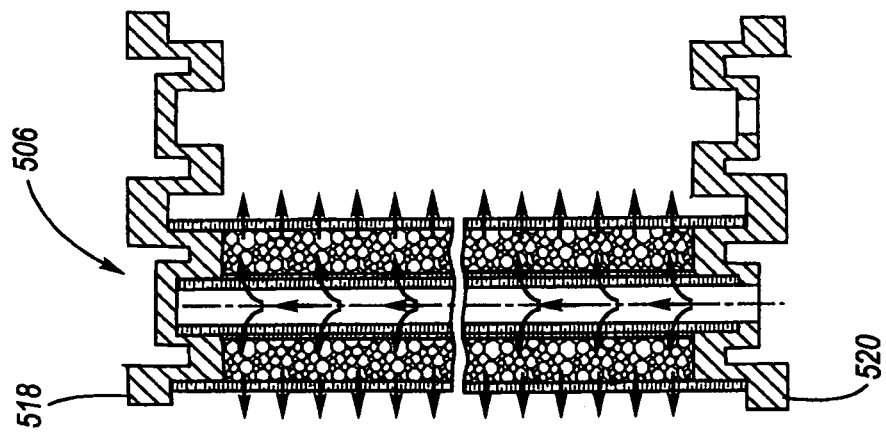
FIG. 5C is a cross-sectional view of a third apparatus connector according to the third preferred embodiment of the present invention.
Figures 5A, 5B:
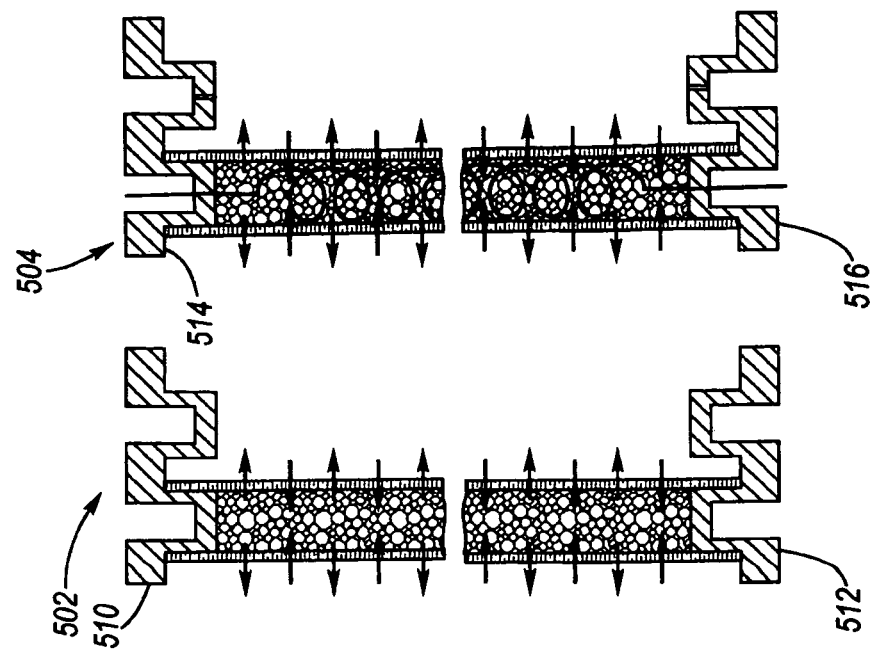
FIG. 5A is a cross-sectional view of a first apparatus connector according to the first preferred embodiment of the present invention.
FIG. 5B is a cross-sectional view of a second apparatus connector according to the second preferred embodiment of the present invention.

FIG. 4 is a cross-sectional view of an example of a fourth apparatus 400 according to a fourth preferred embodiment of the present invention. The fourth apparatus 400 consists of a hollow, continuous (ie., non-porous, non-perforated) inner heat exchanger tube or pipe 402, preferably an electrical conductor, herein referred to as a heat exchanger, placed in the axial center 404 of the tube 102 of the first apparatus 100, wherein the tube 102 is now, de facto, an "outer tube" in relation to the heat exchanger, and passes sealingly through end-fittings 406, 408. The highly porous gas storage material 410, particles in powder or granular (pellet) form, is pressed against the heat exchanger 402 to achieve optimal thermal contact between the heat exchanger and the highly porous gas storage material resulting in improved thermal conductivity during the adsorption and desorption processes, wherein a cooling media 412 of suitable temperature flows through the heat exchanger during the adsorption process to remove the heat generated by the adsorption process and a heating media 412' of suitable temperature flows through the heat exchanger during the desorption process to supply the required desorption energy. Highly porous gas storage materials suitable for adsorption and desorption of gases are known in the prior art. Such materials are, for example, activated charcoal, metal organic frameworks (MOFs and MILs), nano-cubes, coordination polymers (CPs) or polymers of intrinsic microporosity, as mentioned hereinabove.

A gas 414 surrounds the sidewall 104 of (outer) tube 102, for example hydrogen, under suitable temperature and pressure, and a penetration portion 416 of the gas enters the tube by penetrating into the very fine perforated, woven or fleeced sidewall through the pores or perforations 116 thereof, wherein an adsorbed portion 418 of the penetration portion of the gas is adsorbed by the highly porous gas storage material 410. A cooling media 412 of suitable temperature and pressure flows through heat exchanger 402 during the adsorption process to remove the heat generated by the adsorption process and thereby cools the non-adsorbed portion 420 of the penetration portion 416 of the gas 414. The now cooled, non-adsorbed portion 422 of the gas 414 leaves the (outer) tube 102 by penetrating out of its very fine perforated, woven or fleeced sidewall 104 through the pores or perforations 116 thereof.

Alternately, the non-adsorbed portion 420 of the gas is heated by heat generated by the adsorption process and leaves the (outer) tube by penetrating out of its very fine perforated, woven or fleeced sidewall through the pores or perforations thereof, and thereby acts as a convective cooling media in conjunction with the cooling media flowing through the heat exchanger.

To desorb the adsorbed portion 418 of the gas 414 adsorbed by the highly porous gas storage material 410 within the (outer) tube 102, a heating media 412', of suitable temperature and pressure flows through the heat exchanger 402 during the desorption process to supply the required desorption energy to the highly porous gas storage material to thereby cause the adsorbed gas to desorb. The desorbed gas 422' leaves the (outer) tube 102 by penetrating out of its very fine perforated, woven or fleeced sidewall 104 through the pores or perforations 116 thereof.

Alternatively, a second gas 414, suitably heated, under suitable pressure, and, preferably, the same gas as the adsorbed gas, enters the (outer) tube as a penetrating gas 416 into its very fine perforated, woven or fleeced sidewall through the pores or perforations thereof, wherein the second gas, acting as a convective heating media, in conjunction with a heating media of suitable temperature and pressure flowing through the heat exchanger, collectively provide the required desorption energy to the highly porous gas storage material to thereby desorb the adsorbed gas. The desorbed gas and the second gas leave the (outer) tube by penetrating out of its very fine perforated, woven or fleeced outermost sidewall through the pores or perforations thereof.

FIGS. 5A through 5D are cross-sectional views 502 through 508 of end-fittings 510 and 512, 514 and 516, 518 and 520, and 522 and 524 for the first through fourth apparatus 100 through 400, respectively, wherein it is shown that the end fittings can be utilized as side-by-side interconnections. The end fittings 510 through 524 can be, for example, fastener strips or fastener plates and may be used to interconnect any number of apparatus 100 through 400 so as to provide combined units 502 through 508, respectively.

Figure 6A:
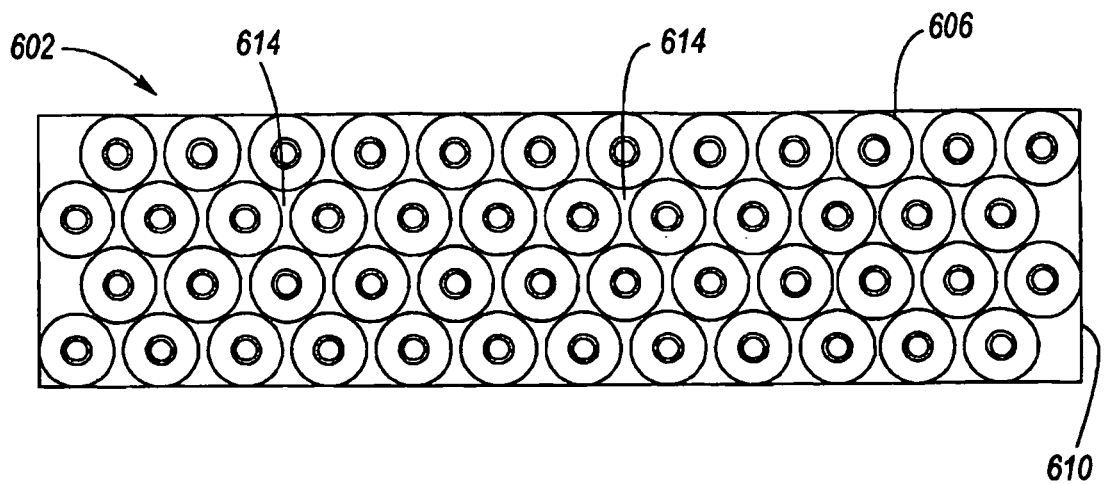
FIG. 6A is a cross-sectional view of interconnected apparatus within a first container according to the present invention.
Figure 6B:
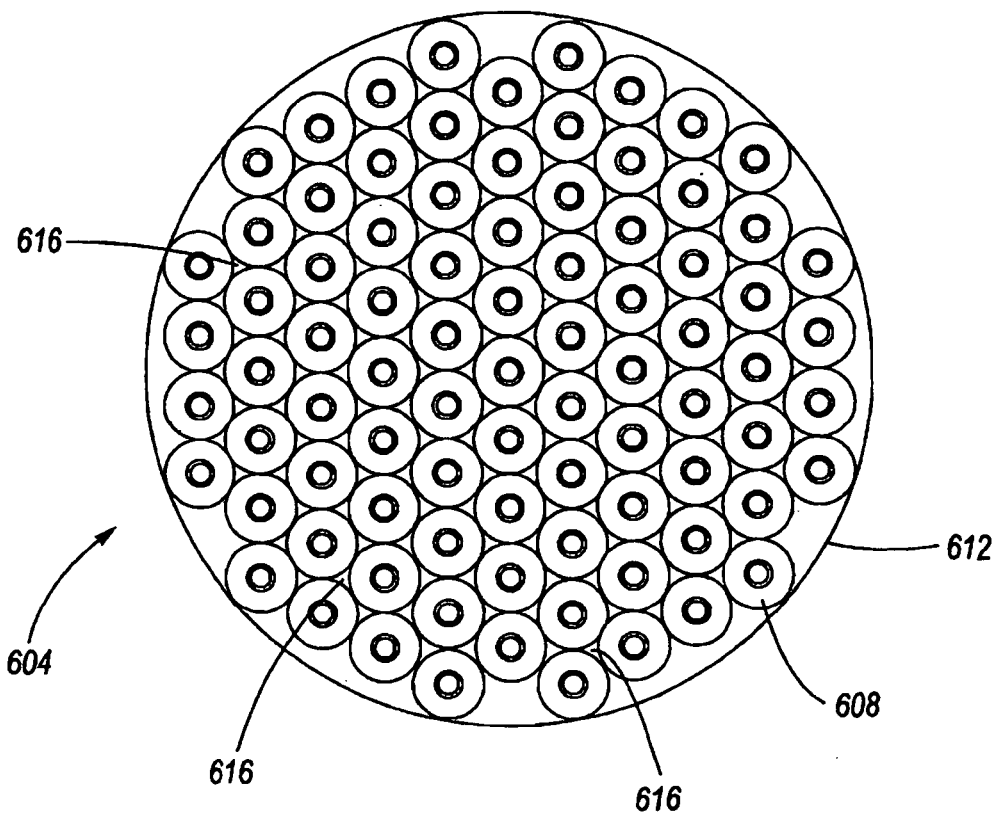
FIG. 6B is a cross-sectional view of interconnected apparatus within a second container according to the present invention.

FIGS. 6A and 6B are cross-sectional views 602, 604 of interconnected first, second, third, or fourth apparatus 606, 608, as previously described, within a first container 610 or a second container 612 according to the present invention. Containers 610, 612 allow for the supply and evacuation of gas to and from, respectively, the interconnected apparatus 606, 608 in the axial direction into the non-occupied regions 614, 616 as well as provide support and containment for the sidewall of each apparatus.

The present invention provides for the appropriate arrangement of highly porous gas storage materials, particles in powder or granular form, resulting in storage systems with high functional security and ease of production and operation. This is obtained by providing an unobstructed path for the supply and removal of gas through a porous structure, optimal thermal contact for the heating and cooling of the storage material, optimal compensation of the heat energy for the adsorption process, optimal supply of the necessary heat energy for the desorption process, and a quick mechanical process for the installation of the storage material.

Also, the first and third embodiments of the present invention eliminate the necessity of heat exchangers or heating elements by using a heated gas for the convective transfer of the required desorption heat energy.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An apparatus for selectively adsorbing gas during adsorption processes and desorbing gas during desorption processes, comprising:
   a tube comprising:
      a porous sidewall having a first end and an opposite second end;
      a first end-fitting connected to said first end, wherein said first end is sealingly closed by said first end fitting; and
      a second end-fitting connected to said second end, wherein said second end is sealingly closed by said second end fitting; and
   a particulate porous gas storage material located within said tube, wherein said material cross-sectionally spans said tube;
   wherein said material is selected from the group consisting of: metal organic frameworks, nanocubes, coordination polymers, prussian blue analogues, and polymers having intrinsic microporosity;
   wherein the porosity of said sidewall is predetermined to prevent said material from passing threrethrough; and
   wherein the porosity of the sidewall is further predetermined to allow, during adsorption processes, gas to pass through said sidewall and be adsorbed by said material, and, during desorption processes, to allow gas desorbed from the material to pass out through said sidewall.

2. The apparatus of claim 1, wherein said sidewall is selected from the group consisting of: very fine perforated materials, woven materials and fleece materials.

3. An apparatus for selectively adsorbing gas during adsorption processes and desorbing gas during desorption processes, comprising:
   a tube comprising:
      a porous sidewall having a first end and an opposite second end;
      a first end-fitting sealingly connected to said first end; and
      a second end-fitting sealingly connected to said second end; and
   a particulate porous gas storage material located within said tube, wherein the porosity of said sidewall is predetermined to prevent said material from passing threrethrough, and wherein the porosity of the sidewall is further predetermined to allow, during adsorption processes, gas to pass through said sidewall and be adsorbed by said material, and, during desorption processes, to allow gas desorbed from the material to pass out through said sidewal1;
   a heating coil located within said sidewall and extending generally between said first and second end-fittings; and
   an electrical lead from said heating coil extending out of each of said first and second end-fittings;
   wherein electrical energy supplied to said heating coil provides heat energy for the desorption processes.

4. The apparatus of claim 3, wherein said sidewall is selected from the group consisting of: very fine perforated materials, woven materials and fleece materials.

5. The apparatus of claim 4, wherein said material is selected from the group consisting of: activated charcoal, metal organic frameworks, nanocubes, coordination polymers, prussian blue analogues, and polymers having intrinsic microporosity.

6. A system for selectively adsorbing gas during adsorption processes and desorbing gas during desorption processes, comprising:
   a container; and
   a plurality of apparatus within said container, each apparatus comprising:
      a tube comprising:
         a porous sidewall having a first end and an opposite second end;
         a first end-fitting sealingly connected to said first end; and
         a second end-fitting sealingly connected to said second end; and
      a particulate porous gas storage material located within said tube;
         wherein the porosity of said sidewall is predetermined to prevent said material from passing threrethrough; and
         wherein the porosity of the sidewall is further predetermined to allow, during adsorption processes, gas to pass through said sidewall and be adsorbed by said material, and, during desorption processes, to allow gas desorbed from the material to pass out through said sidewall;
   wherein said container contains the gas passing through said sidewall of each said Apparatus; and
   wherein each first end fitting is mutually interconnected in a side-by-side relationship; and wherein each second end-fitting is mutually interconnected in the side-by-side relationship.

7. The system of claim 6, wherein for each said apparatus, said sidewall is selected from the group consisting of: very fine perforated materials, woven materials and fleece materials, and said material is selected from the group consisting of: activated charcoal, metal organic frameworks, nanocubes, coordination polymers, prussian blue analogues, and polymers having intrinsic microporosity.

8. The system of claim 6, wherein each said apparatus further comprises:
   a heating coil located within said sidewall and extending generally between said first and second end fittings; and
   an electrical lead from said heating coil extending out of each of said first and second fittings;
   wherein electrical energy supplied to said heating coil provides heat energy for the desorption processes.

9. The system of claim 8, wherein for each said apparatus, said sidewall is selected from the group consisting of: very fine perforated materials, woven materials and fleece materials, and said material is selected from the group consisting of: activated charcoal, metal organic frameworks, nanocubes, coordination polymers, prussian blue analogues, and polymers having intrinsic microporosity.

10. The system of claim 6, wherein each said apparatus further comprises:
   an inner tube located generally at an axial center of said sidewall passing through one of said first and second end-fittings and closed at the other of said first and second end-fittings, said inner tube being porous, wherein the porosity of said inner tube is predetermined to prevent said material from passing threrethrough; and wherein the porosity of the inner tube is further predetermined to allow, during the adsorption and desorption processes, gas to pass therethrough.

11. The system of claim 10, wherein for each said apparatus, said sidewall is selected from the group consisting of: very fine perforated materials, woven materials and fleece materials, and said material is selected from the group con sisting of: activated charcoal, metal organic frameworks, nanocubes, coordination polymers, prussian blue analogues, and polymers having intrinsic microporosity.

12. The system of claim 6, wherein each said apparatus further comprises an inner tube located generally at an axial center of said sidewall passing through said first and second end-fittings, said inner tube being continuous, wherein temperature regulating media passing through said inner tube is confined thereinside such that said material remains free of the media.

13. The system of claim 12, wherein for each said apparatus, said sidewall is selected from the group consisting of: very fine perforated materials, woven materials and fleece materials, and said material is selected from the group consisting of: activated charcoal, metal organic frameworks, nanocubes, coordination polymers, prussian blue analogues, and polymers having intrinsic microporosity.

\* \* \* \* \*